United States Patent
Brush

(10) Patent No.: US 10,553,082 B2
(45) Date of Patent: Feb. 4, 2020

(54) SKIMMER BLOCKER

(71) Applicant: Phillips 66 Company, Houston, TX (US)

(72) Inventor: Gary S. Brush, Bellaire, TX (US)

(73) Assignee: PHILLIPS 66 COMPANY, Houston, TX (US)

( * ) Notice: Subject to any disclaimer, the term of this patent is extended or adjusted under 35 U.S.C. 154(b) by 0 days.

(21) Appl. No.: 15/078,573

(22) Filed: Mar. 23, 2016

(65) Prior Publication Data
US 2017/0278360 A1    Sep. 28, 2017

(51) Int. Cl.
G07F 19/00    (2006.01)
G06K 7/01    (2006.01)

(52) U.S. Cl.
CPC ........... *G07F 19/2055* (2013.01); *G06K 7/01* (2013.01)

(58) Field of Classification Search
CPC .... G07F 19/2055; G07F 19/20; G07F 19/209; G07F 7/0873; G07F 7/122; G06K 7/0078; G06K 7/087; G06Q 10/06; G06Q 20/04; G06Q 20/18; G06Q 20/367; G06Q 20/3674; G06Q 20/3823; H04K 2203/20

USPC .......................................................... 235/379
See application file for complete search history.

(56) References Cited

U.S. PATENT DOCUMENTS

| 7,810,734 B2 | 10/2010 | Rakoff et al. | |
|---|---|---|---|
| 8,240,566 B1 | 8/2012 | Criscitiello | |
| 8,622,297 B1* | 1/2014 | Yokomoto | G07F 19/2055 109/8 |
| 2007/0040023 A1 | 2/2007 | Ruggirello et al. | |
| 2013/0037614 A1* | 2/2013 | Criscitiello | G06K 7/0078 235/449 |
| 2014/0151450 A1* | 6/2014 | Lewis | G07F 19/209 235/379 |

* cited by examiner

*Primary Examiner* — Steven S Paik
*Assistant Examiner* — Tae W Kim
(74) *Attorney, Agent, or Firm* — Phillips 66 Company

(57) ABSTRACT

The invention relates to blocking fraudulent gathering of credit card and debit card information during a legitimate payment transaction at a credit/debit card reader. The invention includes the installation, preferably in a non-uniform manner, of blockers onto one or more faces or surfaces of the card reader. Properly installed blockers will tend to prevent the easy installation of a flush mounted skimmer device that is designed to overlay the legitimate card reader at a store or point of sale location such as a gasoline pump.

2 Claims, 6 Drawing Sheets

SKIMMER BLOCKER

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to preventing credit card data theft and protecting credit card transactions from compromise by thieves.

BACKGROUND OF THE INVENTION

Credit cards and now debit cards are carried by most Americans and by many around the world. Undertaking the quick swipe of such cards to carry out transactions is now a way of life. However, such transactions are vulnerable to sophisticated thieves seeking credit card information and using that information for other thefts and fraudulent transactions. One new manner of obtaining such credit card information is to put skimmer devices on credit/debit card readers at point of sale purchase locations such as gas pumps at gas stations and at vending machines, and also at credit/debit card devices at checkouts in stores and markets such as grocery stores, convenience stores, department stores and similar retail and wholesale establishments.

Many efforts are being undertaken to harden the infrastructure of the credit and debit card systems, but while those efforts are ongoing, thieves continue to gather data and use it to steal millions of dollars from banks and financial institutions as well as fraudulently obtain goods and merchandise from vendors. Theft prevention may take many forms and it will probably take many different tactics to limit and reduce such crime in the face of smart and inventive criminals. As with all human endeavors, cost is always a consideration. A low cost and simple tactic can be very helpful while more involved and more expensive tactics are also being developed and deployed.

BRIEF SUMMARY OF THE DISCLOSURE

The invention more particularly includes relates to a process for blocking fraudulent gathering of card data during an authentic transaction by installing a card reader for undertaking payment transactions through the use of a credit or debit card wherein the card reader has at least one face presented to the customer wherein one or more blockers is also installed onto at least one face of the card reader in a manner to prevent the innocuous installation of a flush mounted card skimmer device over the card reader. The blocker would preferably be a three dimensional structure having a thickness that would create a noticeable space between a skimmer device and a card reader when the skimmer device is attempted to be laid flush over the card reader.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1A:
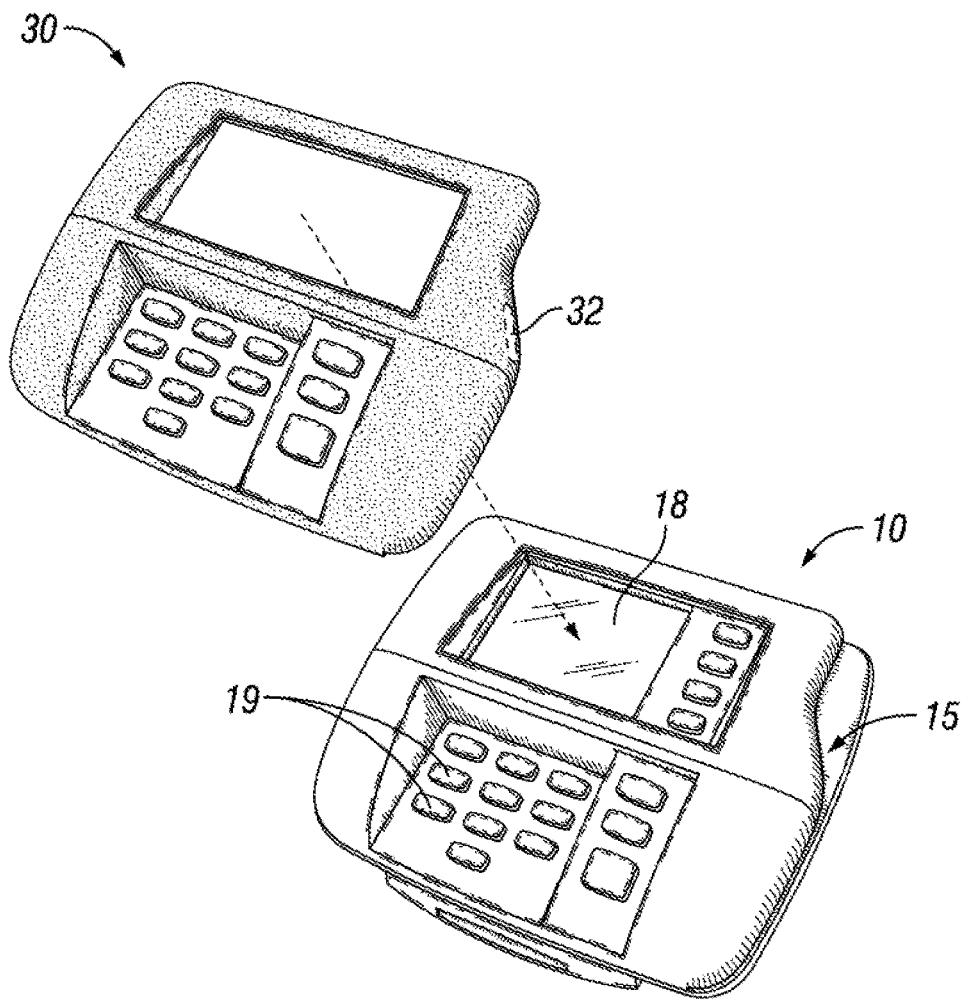
FIG. 1A is an exploded perspective view showing a skimmer device and a credit/debit card reader to process credit and debit card information for a purchase transaction.
Figure 1B:
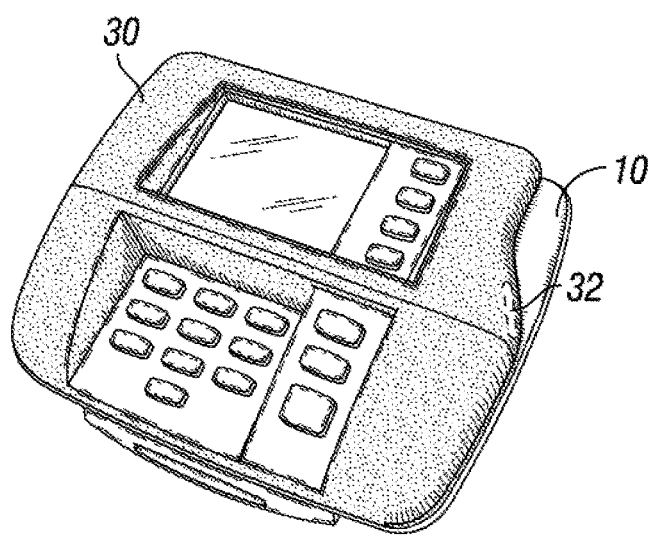
FIG. 1B is a perspective view of the skimmer laying flush over the credit/debit card reader in a manner where the skimmer is intended to be unnoticed, but where the credit/debit card data may be collected during a legal purchase transaction for later illegal and fraudulent use.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As shown in FIGS. 1A, 1B, 2A, 2B, and 2C, a credit/debit card reader is generally indicated by the numeral 10. The card reader 10 includes a slot 15 at the right for sliding a credit card or debit card for completing a purchase or payment transaction. The card reader 10 further includes a screen 18 and buttons 19 for displaying transaction information and taking additional information such as personal identification numbers (PIN) or zip code information or other authenticating information.

Aligned to fit over the card reader 10 is a skimmer 30. The skimmer 32 is a device created by thieves for collecting credit card and debit card information illicitly and surreptitiously, while neither the vendor, the customer nor the attendant are aware. A thief may position the skimmer 30 by distracting the attendant with a request for a package of cigarettes that require the attendant to turn his back toward the card reader 10 for a few seconds. The thief may have the skimmer 30 within a jacket and quickly slip it over the legitimate credit/debit card reader 10. The skimmer 30 may be left in place for a period of time to collect credit and debit card information. The skimmer includes memory (not shown) and card reader device 32 keeping track of each card run through the credit card slot along with any key strokes inputted during a legitimate transaction.

After a period of time, the thief will come back to the store recover the skimmer for downloading the data now collected. It is not inconceivable that the thief may come into the store to swap out skimmers 30 putting a new one over the credit/debit card reader 10 to collect additional information while the first skimmer 30 is taken back for downloading information.

The present invention has been created to provide a simple, low cost method of interfering with thieves and their fraudulent efforts. The invention is more particularly shown in FIGS. 3, 4A, 4B, and 4C as blockers 41 and 42. The blockers 41 and 42 are three dimensional structures constructed or robust material such as an acrylic and glued or adhered onto the credit/debit card reader with a strong epoxy. Only one blocker 41 or 41 is needed to meet the basic intent of the invention, but additional blockers should be inexpensive and would create a randomness to the card readers 10 and would require more time for the thief to try and remove to fit the skimmer 30 onto the card reader 10. The blockers 41 and 42 may be installed anywhere on the front of the card reader 10 where the skimmer 30 may be expected to cover. It is preferred that the blockers 41 and 42 would have an appealing look such as logo information for the store and have an irregular shape, such as one that would go with a logo. If there are more than one card reader 10 in a store, each such reader may and should preferably have a different arrangement of the blockers 41 and 42.

Figure 2A:
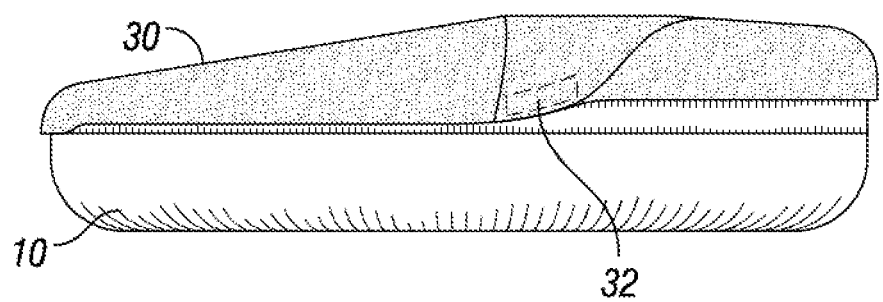
FIG. 2A is a side profile of the skimmer laying flush over the card reader.
Figure 2B:
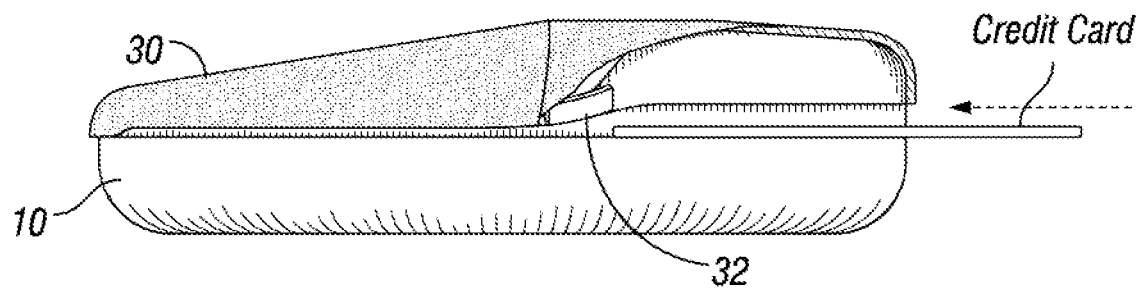
FIG. 2B is a cutaway side profile of the skimmer showing a credit card ready to be swiped through the card reader with a reader/memory device in the skimmer for illicitly capturing the credit/debit card information.
Figure 2C:
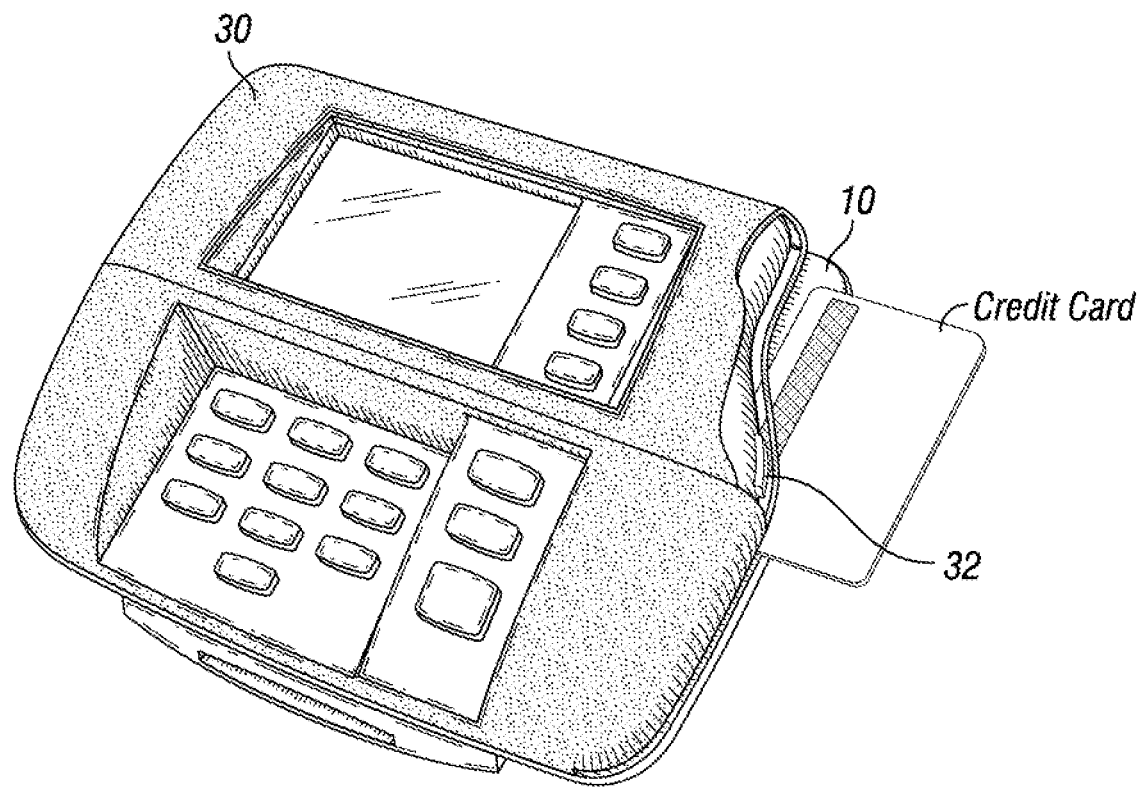
FIG. 2C is a perspective view of the skimmer laying flush over the card reader with a credit card positioned for swiping through the slot to effectuate the intended transaction while the credit/debit card data will also be illicitly captured.
Figure 3:
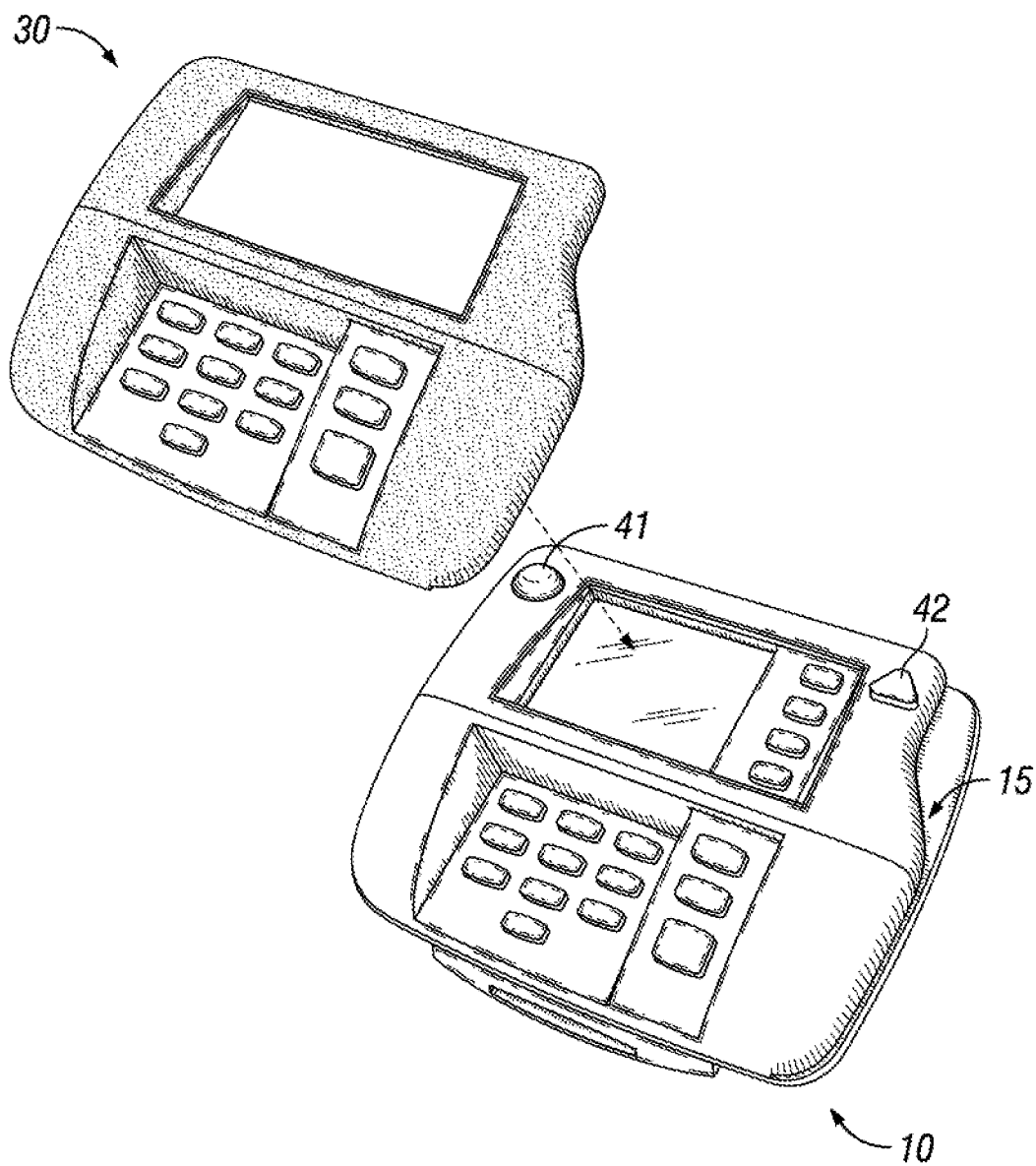
FIG. 3 is an exploded perspective view similar to FIG. 1, with blockers according to the present invention positioned to frustrate the tight and unnoticeable installation of the skimmer on a card reader.
Figure 4A:
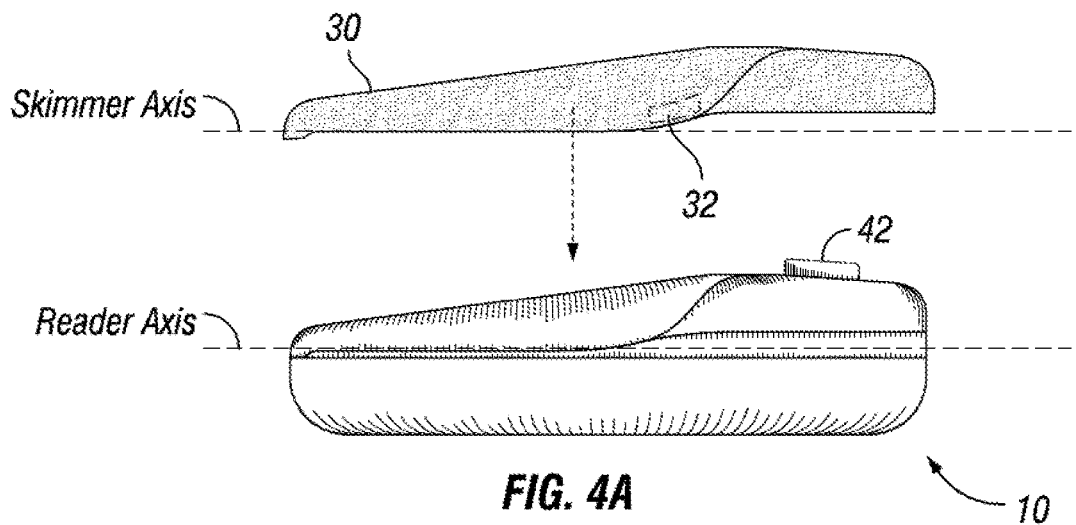
FIG. 4A is an exploded side profile view showing the card reader with a blocker according to the present invention preventing the skimmer device from nesting flush over the card reader and exposing the presence of the skimmer on the card reader.
Figure 4B:
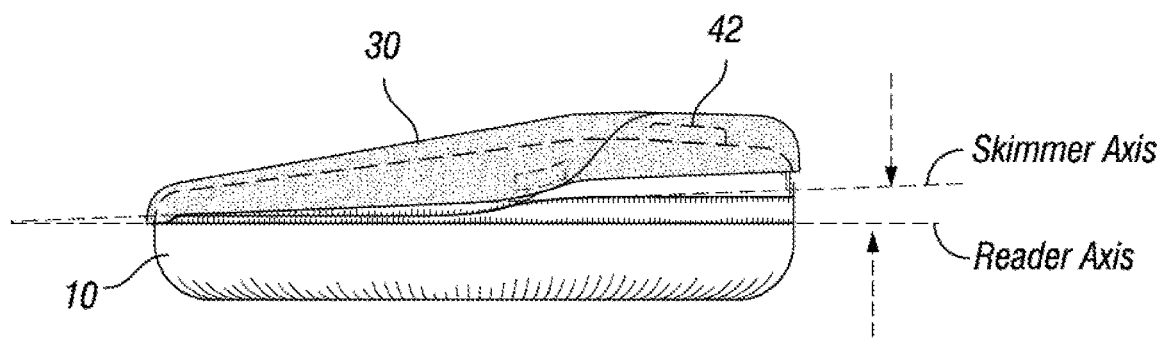
FIG. 4B is a side profile view showing the card reader with a blocker according to the present invention preventing the skimmer device from nesting flush over the card reader and exposing the presence of the skimmer on the card reader.
Figure 4C:
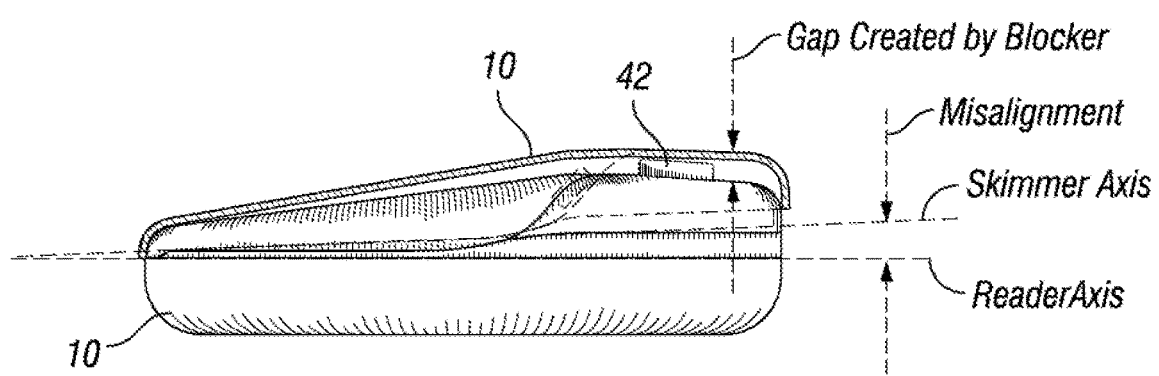
FIG. 4C is a cross section view showing the blocker preventing the skimmer device from nesting flush over the card reader and exposing the presence of the skimmer on the card reader.

As best shown in FIGS. 2B and 4A, the reader 10 has an axis (as shown) along which the credit card or debit card is slid along the card slot 15. Without the blockers 41 and 42 in place, the skimmer axis would align with the reader axis when the skimmer 30 is arranged flush with card reader 10. With the blockers in place, as best shown in FIGS. 4B and 4C, the thickness dimension of the blockers 41 and 42 would alter the respective axes so that they are prevented from aligning. While this misalignment may be enough to prevent the skimmer 30 from illicitly capturing the credit or debit card information, more ideally the unauthorized presence of the skimmer 30 on the card reader 10 will be revealed to the attendant and the customer and the skimmer 30 will be removed. The actual thief may not be easily caught, but frustrating the efforts of the thieves is the primary purpose of the blockers 41 and 42.

Manufacturers of carder reader devices all have their own proprietary shape, look and feel. The blockers 41 and 42 are hopefully useful with all such arrangements. The thieves have surely figured out how to make very convincing looking covers for the most common card readers. As the inventors were first presented with the problem of skimmers 30, they were told that one of the skimmers 30 that were recovered prior to the thief being able to return to the store and recover the skimmer and the data thereon, that the reason it was noticed is that the skimmer cover appeared very new and was covering a card reader that had been quite beat up and scratched. In this case, the store owner, cashiers and consumers were lucky that the new appearing skimmer 30 turned out to be quite noticeable. However, law-abiding store owners, cashiers and innocent consumers should not have to depend on luck alone to help prevent illegal credit card skimming.

Figure 5:
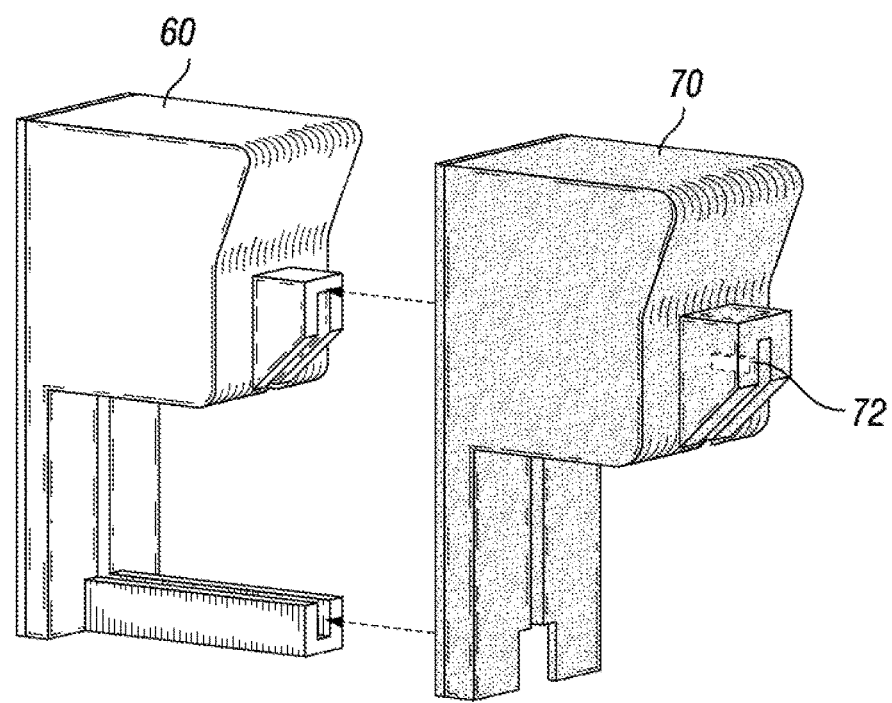
FIG. 5 is an exploded perspective view of another form of card reader that is typically at a point of sale device such as a gasoline pump or vending machine with a skimmer device oriented to overlay the reader and illicitly capture data from legitimate transactions.
Figure 6A:
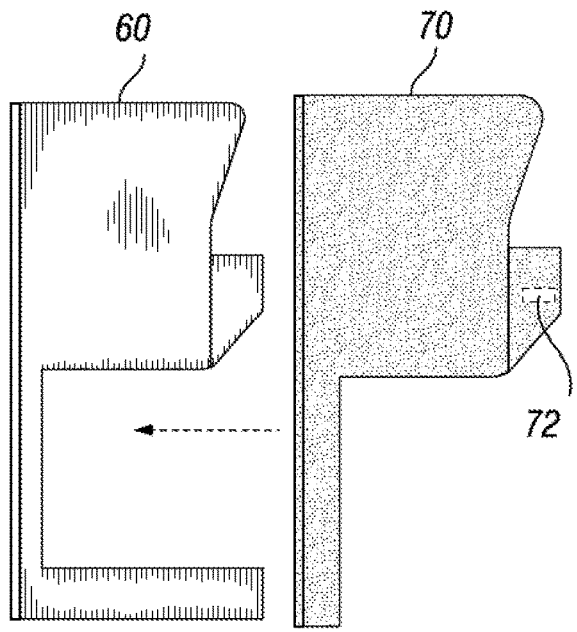
FIG. 6A is an exploded side elevation view of the card reader with the skimmer oriented to slide tight and flush over the card reader.
Figure 6B:
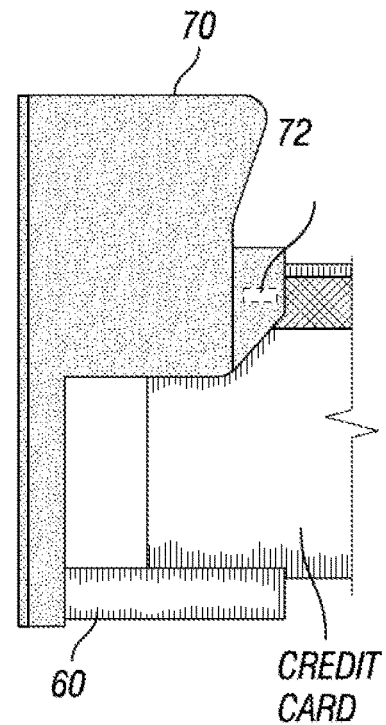
FIG. 6B is a side elevation view of the card reader with the skimmer fitted tightly and flush over the card reader in a manner that will likely go unnoticed by all but the most attentive customer or attendant.
Figure 7:
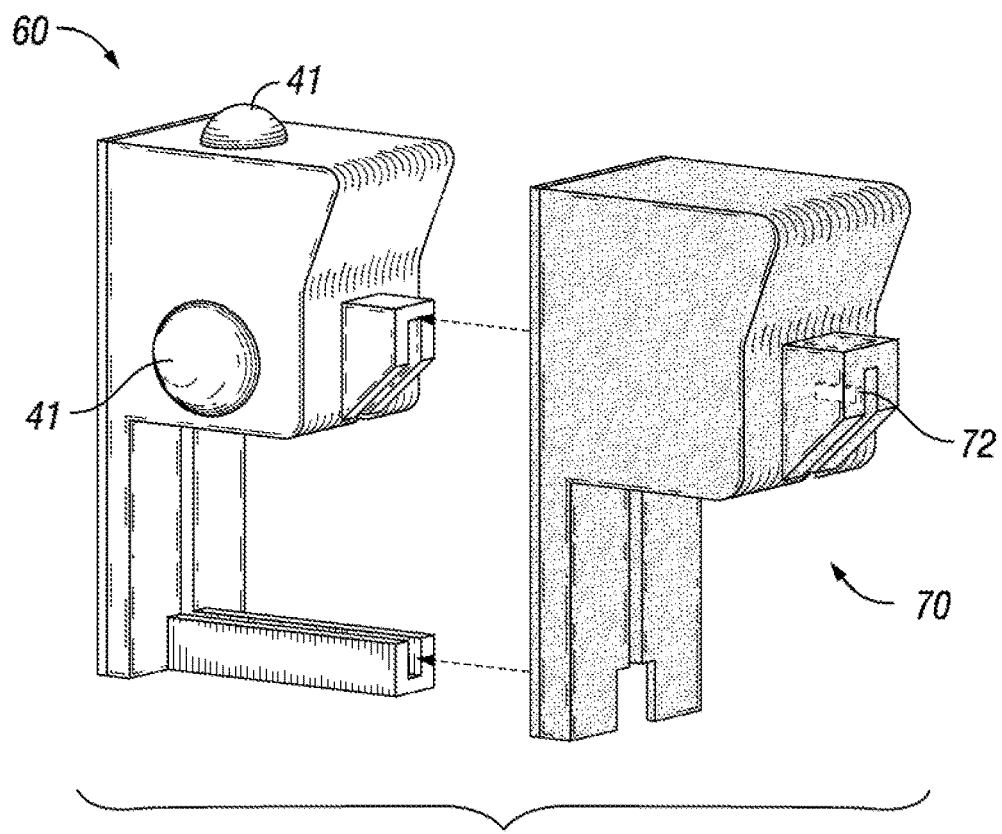
FIG. 7 is an exploded view similar to FIG. 5 with blockers according to the present invention positioned to frustrate the placement of a skimmer over the card reader.
Figure 8:
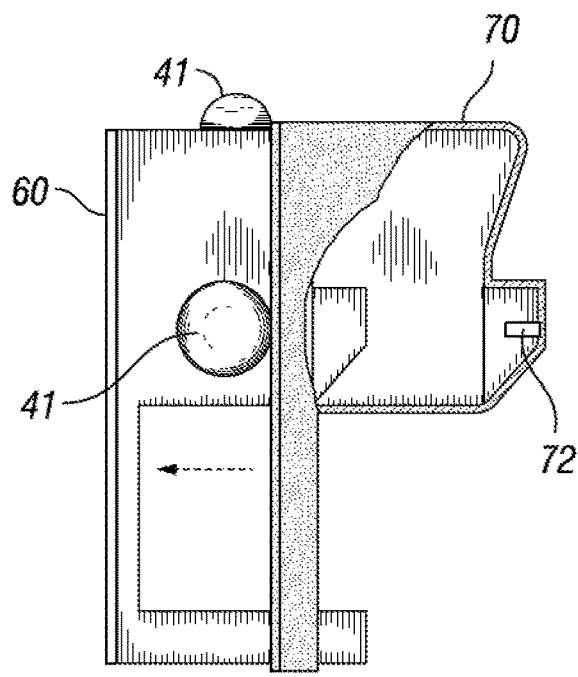
FIG. 8 is a side elevation view better showing the skimmer being blocked from nesting tightly and fully over the card reader.

In the second application, some card readers require the credit or debit card to be inserted into the device and then pulled back out. Such a card reader is shown in FIGS. 5, 6A and 6B and indicated by the number 60. A skimmer 70 is designed to overlay the insertion type of card reader 60. The skimmer 70 includes some type of reader 72 along with some embedded memory (not shown) and is intended to be innocuous and unnoticeable. As shown in FIGS. 7 and 8, blockers 41 are positioned on flat or generally flat surfaces to block the installation of a skimmer. The blockers 41 are round dot type blockers while blocker 42 is shown with a triangular profile. Other shapes are also suitable. Being an inexpensive but robust material such as a rigid plastic is ideal, but wood and metal blockers would work if a strong adhesive were used. As shown in FIG. 8, the skimmer 70 will be quite noticeable if left loosely on the card reader 60.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for blocking fraudulent gathering of card data from an authentic transaction at an establishment with multiple point of sale credit or debit card readers distributed around the establishment where the threat of fraudulent gathering of card data is accomplished with a skimmer device that is surreptitiously installed flush on or over such card readers and remain in position undetected for such point of sale transactions, wherein the process is intended to prevent the undetected installation of a skimmer device, wherein the process comprises:
 a) acquiring a strong epoxy adhesive and a plurality of three-dimensional blockers made of a robust plastic such that at least one blocker is acquired for each card reader at the establishment, wherein of the three-dimensional blockers, each blocker has at least one flat side and an opposite side thereof opposite the one flat side such that a first dimension and a second dimension define the shape and size of the one flat side and the third dimension defines the thickness of the blocker, and wherein the third dimension is the smallest of the three dimensions of the blocker;

b) applying one or more three-dimensional blockers to each of the multiple point of sale credit or debit card readers wherein the each card reader has at least one card aperture for card insertion or sliding and at least one face presented to the customer and wherein the card aperture has a long dimension and a short dimension for receiving a relatively flat card;

c) identifying at least one location on a one relatively flat surface near the card aperture on the face of the card reader presented to the customer, wherein the at least one location is for attaching the one flat side of the one or more three-dimensional blockers;

d) installing the one or more three-dimensional blockers by attaching the one flat side of the three dimensional blockers to the at least one location on the relatively flat surfaces near the card aperture with the strong epoxy adhesive wherein for each installation of the one or more three-dimensional blockers at each of the multiple card readers, the one or more three-dimensional blockers are installed in differing locations or orientations with respect to the card aperture at each card reader of the multiple card readers such that, after installation of the one or more three-dimensional blockers at all of the card readers at the establishment, no two card readers at the establishment end up with the same arrangement of the one or more three-dimensional blockers on the face of the card reader whereby each face of the card reader presents a different appearance and configuration of the one or more three-dimensional blockers relative to the card slot; and wherein the longest dimension of the blocker is smaller than the long dimension of the card aperture, and the third dimension of the blocker is sufficient to prevent a to-be-flush-mounted skimmer device from settling flush on the card reader, thereby creating an obvious and apparent gap between the face of the card reader and any skimmer device that might be placed over the face of the card reader, wherein a unique configuration of the one or more three-dimensional blockers relative to the card aperture at each of the card readers thereby prevents a skimmer device with a common design from being installed at any of the card readers at the establishment and it is also further unlikely that the skimmer device will have a similar look to an altered appearance of the card reader and wherein the one or more three dimensional blockers are installed in a non-uniform manner or pattern so that the skimmer device may not be made to accommodate the one or more three dimensional blockers and easily replicated the look and the altered appearance of the card reader with the one or more three dimensional blockers thereon.

2. The process according to claim 1 wherein the longest dimension of the one or more three dimensional blockers are no more than five times greater than the shortest of the three dimensions of the one or more three dimensional blockers.

* * * * *